UNITED STATES PATENT OFFICE.

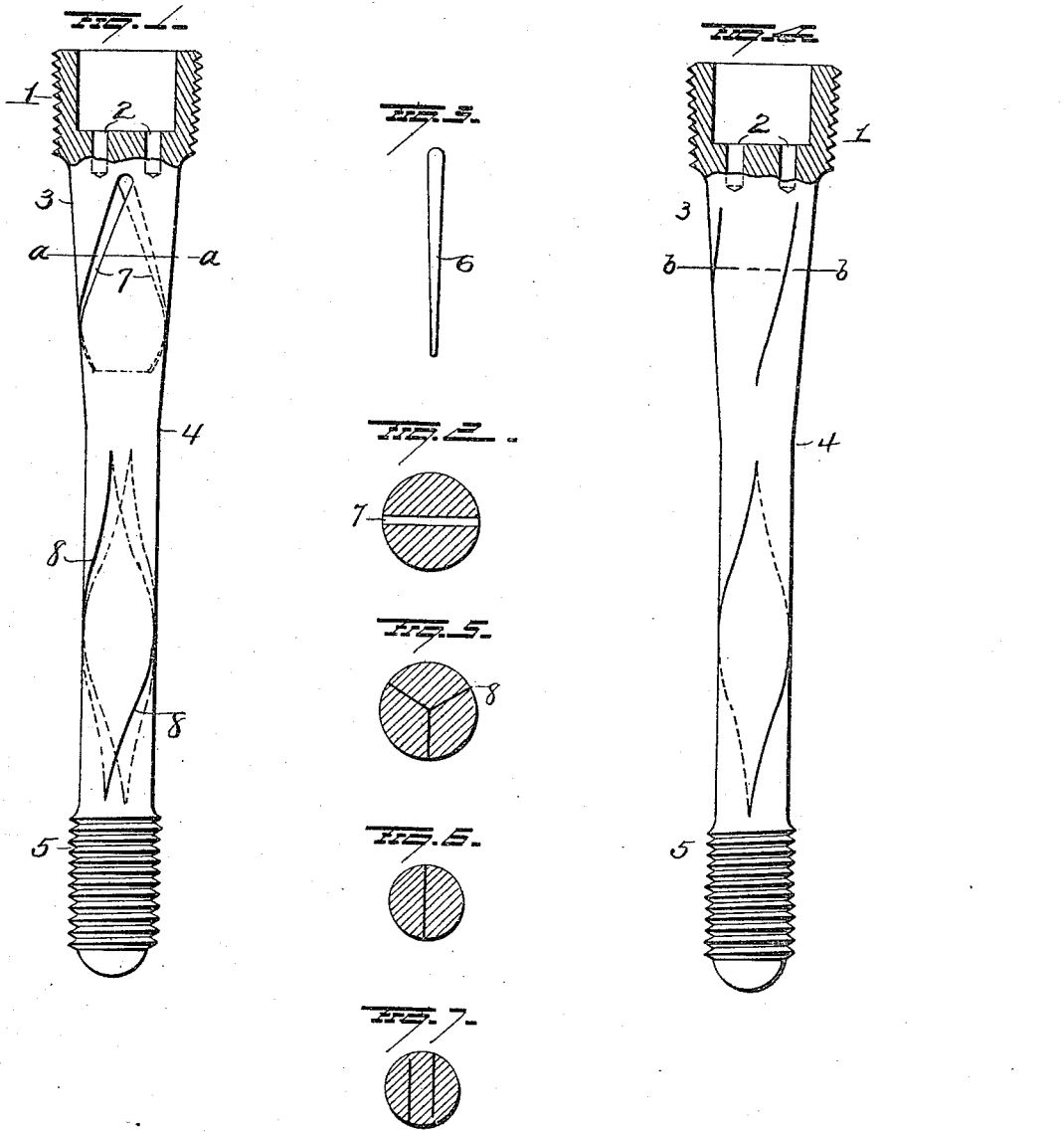

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT FOR BOILERS.

1,188,915.      Specification of Letters Patent.      Patented June 27, 1916.

Application filed November 30, 1914. Serial No. 874,827.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolts for Boilers; and I do hereby declare the following to be a full, clear, and exact description of the invention, such as will enable others skilled in the art to which it appertains to make and use the same.

My invention relates to an improvement in stay bolts designed particularly for repair work, or to replace an ordinary flexible stay bolt of the type wherein the head of the bolt is mounted for universal movement in a sleeve screwed into the outer sheet of the boiler, and it consists in the details of construction as will be more fully described and pointed out in the claims.

In the accompanying drawings, Figure 1 is a view in elevation of a bolt embodying my invention; Fig. 2 is a view in transverse section on the line *a a* of Fig. 1. Fig. 3 is a view of the slug removed by slot punching the shank of the bolt; Fig. 4 is a view in elevation partly in section of a modified form; Fig. 5 is a view in cross section on the line *b b* of Fig. 4; Fig. 6 is a view in cross section of the cylindrical portion of the shank of the tool and Fig. 7 is a view in section of a modified form of same.

The bolt is provided with an enlarged head 1 threaded externally, and which is adapted to be screwed into the threaded hole in the outer sheet of the boiler. This head 1 is of the size, or slightly larger than the standard size sleeve used with the ordinary flexible stay bolt, so as to fit the threaded hole made for the said sleeve, or the same hole re-cut or threaded, and is preferably hollowed out as shown in dotted lines in Fig. 1, and in full lines in Fig. 4, and is provided with recesses for a spanner wrench or other tool employed for securing the bolt to the boiler sheets.

The shank of the bolt is tapered from the head as at 3 part way its length, and is cylindrical from the point 4 to its other threaded end 5.

In order to weaken the enlarged part 3 of the shank, or the part thereof that is adjacent to the head, so as to make it more flexible, I punch therefrom a slug 6 the sides of which are substantially parallel with the tapering sides of the shank, thus producing in the latter a triangular slot 7 which is widest adjacent the head and narrows to a point adjacent the juncture of the tapering and cylindrical portions of the shank. This slot is left in its open condition, and is of such size that the cross section of the enlarged or tapered part of the shank will contain about as much metal as the cross sectional area of the cylindrical portion of the shank, so that the tapered part will not be stronger than the cylindrical part, but will be approximately of the same tensile strength, but more flexible, so as to permit the bolt to accommodate itself to the movements of the boiler sheets, and localize such movement largely to the slotted tapering part of the bolt, which is the part of the bolt that is subjected to the greatest torsional or twisting strains, thus preventing to a large extent the breakage which usually occurs in the bolt adjacent the outer sheet.

The cylindrical portion of the shank is slotted by piercing without removing any of the metal as at 8, from the smaller end of the tapered section to the threaded portion of the shank. This slotting or piercing may extend transversely through the shank as in Fig. 6, or it may have more than one slot as in Fig. 7, which may extend through the shank, but which preferably extends nearly, but not all the way through. Instead however of removing any of the metal from the tapered end of the shank, the latter may be subdivided into a series of sections as shown in Figs. 4 and 5, the members formed by slotting being connected at their ends only. Where there is no metal removed as in Fig. 4 there should be a greater number of slots in the tapered portion, than in the cylindrical portion, so as to divide it into a greater number of smaller sections thereby increasing its flexibility at this point, which as before explained, is the point where the bending and twisting stresses fall, and where flexibility is most needed.

After the bolt has been slotted as described, the whole shank, from its free end to its head is twisted, thus transforming the straight slots into spiral ones. With this bolt the whole shank is flexible, and capable of yielding to lateral stresses, but the tapered portion thereof is more flexible than the other part so as to localize as far as possible, the movements to this part of the shank.

Having fully described my invention what I claim as new and desire to secure by Letters-Patent, is:—

1. As a new article of manufacture, a stay bolt consisting of an enlarged externally threaded head, and a shank, the portion of the latter adjacent the head being enlarged and tapered, and the remaining part thereof cylindrical, the tapering part being slotted, for the purpose described.

2. As a new article of manufacture, a stay bolt consisting of an enlarged externally threaded head and shank, the portion of the latter adjacent the head being enlarged and tapered and provided with an open slot also tapered to conform to the taper of the shank.

3. As a new article of manufacture, a stay bolt consisting of an enlarged externally threaded head and a shank the portion of the shank adjacent the head being enlarged and tapered and the remaining part cylindrical both parts of said shank being slotted and the whole shank twisted, substantially as described.

In testimony whereof, I have signed this specification in the presence of two subscribing witnesses.

ETHAN I. DODDS.

Witnesses:
WM. CHARLES BINGHAM,
EDWIN SPENCER RYCE.

Copies of this patent may be obtained for five cents each, by addressing the "Commissioner of Patents, Washington, D. C."